Inventor
John J. Dreznes
by Parker & Carter
Attorneys

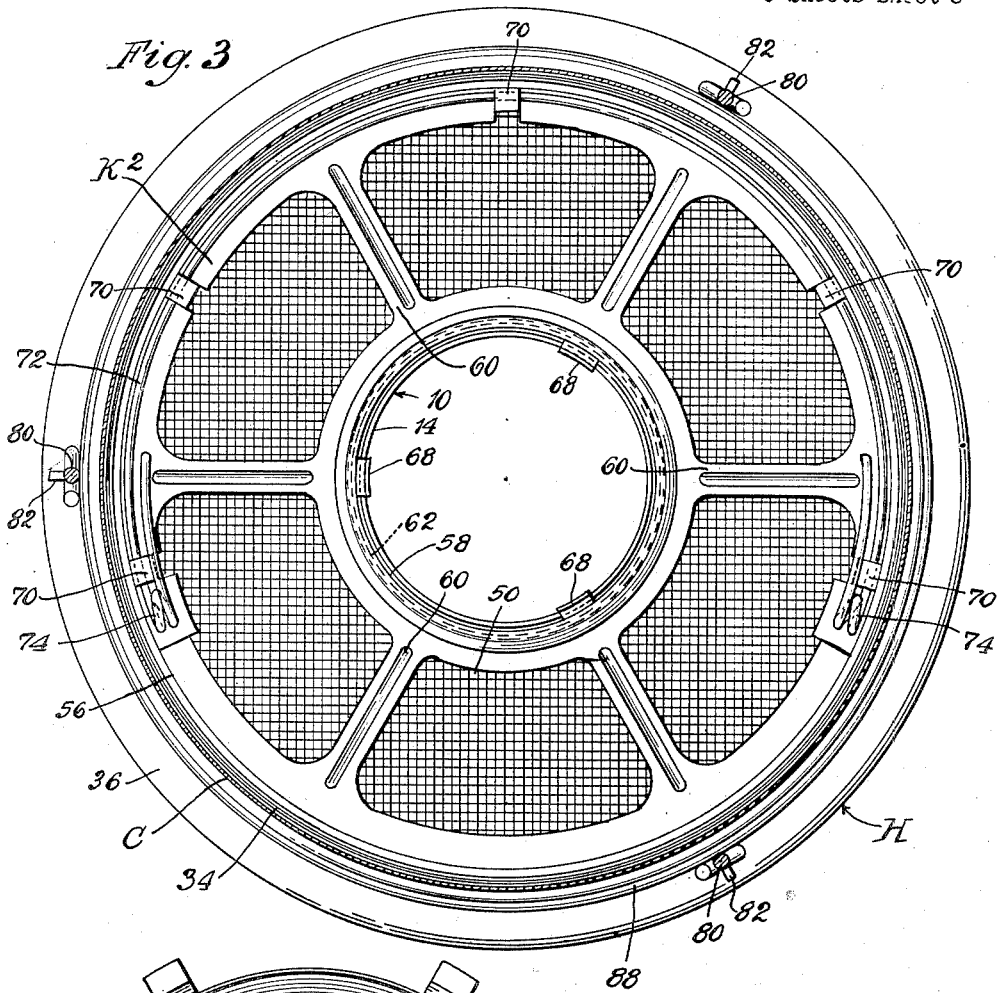
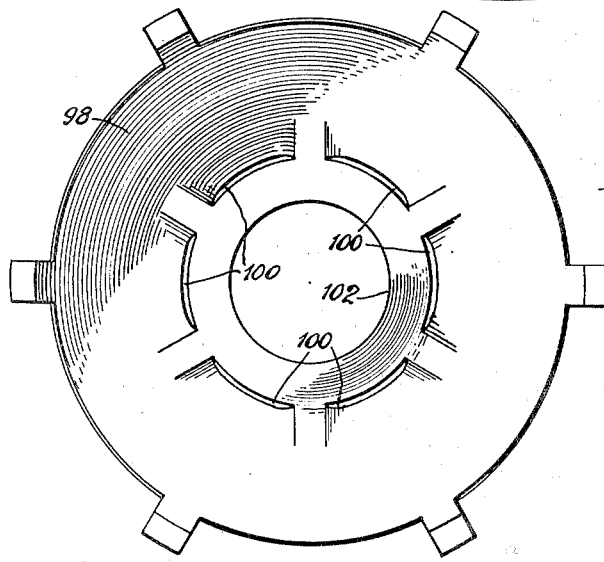

United States Patent Office 2,770,320
Patented Nov. 13, 1956

2,770,320

OIL BATH AIR CLEANER

John J. Dreznes, Chicago, Ill., assignor to United Specialties Company, Chicago, Ill., a corporation of Delaware Application December 19, 1952, Serial No. 326,973

7 Claims. (Cl. 183—15)

My invention resides in the field of oil bath air cleaners or filters, constructed for use in various types of internal combustion engines. More specifically, my new air cleaner or filter is designed as a heavy duty unit to be used for extensive periods of time on heavy equipment such as tractors, trucks and the like.

In cleaners of this type one or more insertable cartridges are removably located in the air stream running to the intake manifold of the internal combustion engine. As these cartridges become thoroughly saturated with foreign matter, the unit is constructed to facilitate their easy removal and replacement after a thorough cleaning. After a cartridge has been in use for a considerable period of time it develops a tendency to stick or freeze in the cleaner due to an accumulation of dirt, grit, and foreign matter. In the use of more than one cartridge the removal of the innermost cartridge can at times present a perplexing problem, in that the shape and construction of the air cleaner housing and the cartridge do not permit any type of handle structure.

To acquire a proper screening action it is necessary to interpose longitudinally along the path of the air stream sufficient screening material to remove an adequate quantity of the foreign material from the air. As would be expected, the screening material first contacting the moving flow of air accumulates a great deal more grit and dirt than those portions of the screening material further removed along the air passage toward the engine.

In air cleaners of the oil bath type, a problem that frequently arises involves the disposition of the excess oil used during the screening operation. Generally, these cleaners are provided with a reservoir or sump in the form of a cup which is attached to the lower end of the air cleaner. As the air moves through the vertical air shaft of the cleaner and through the screening zone, it carries a large quantity of the oil with it. Unless some means is provided to accommodate the excess oil, a large quantity will be carried into the intake manifold of the engine.

Accordingly a primary object of my invention is a series of screening mediums appropriately graduated in their screening intensity so that a progressively finer screening medium is presented to the air in its progress toward the engine.

Another object of my invention is an oil reservoir structure adapted to accommodate the excess oil carried by the air in its flow from the oil sump through the filter area.

Another object of my invention is an improved means that facilitates handling of one or more of the replaceable cartridges.

Another object of my invention is a cartridge structure whereby the cartridges require a predetermined order of insertion.

Other objects will appear from time to time in the ensuing specification and drawings that follow, in which:

Figure 3 is a sectional view of Figure 1 taken along line 3—3; and

Figure 4 is a detail view of a part of the oil bath's internal structure.

Figure 1:
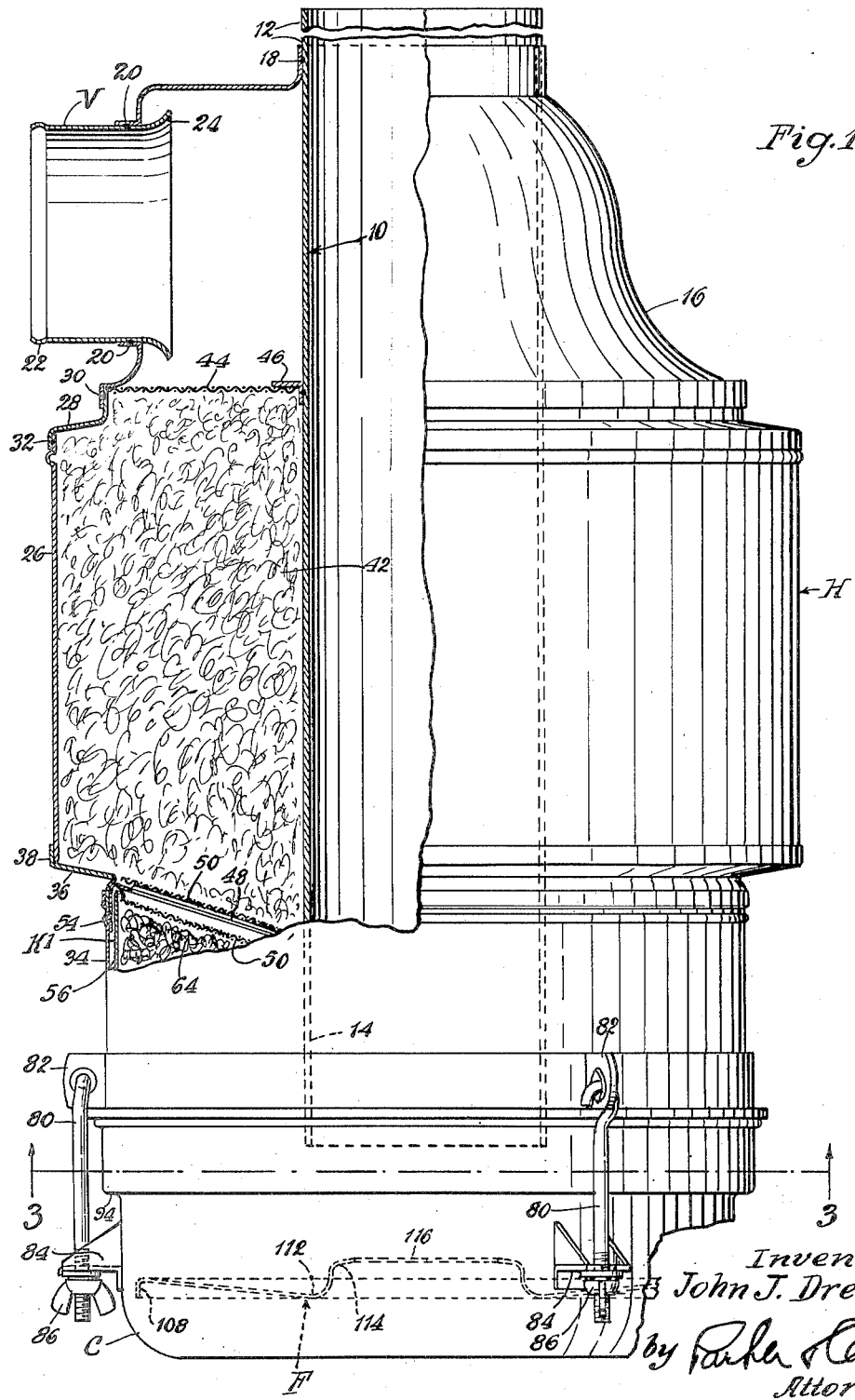
Figure 1 is a side elevation of my new and improved oil bath air cleaner, partly in section.

In Figure 1 my new air filter is shown as comprising a vertically disposed air shaft 10 extending from an upper air intake portion 12 to a lower portion 14 adjacent an oil sump, in the form of a cup, designated generally at C. The air shaft is surrounded and enclosed by an outer cylindrical housing H which extends from the upper air intake portion 12 downwardly to a point approximately at the same horizontal level as the lower portion 14. The lower cylindrical edge of the housing H is enclosed by the oil cup C so that as air is drawn down through the vertical air shaft 10, it is redirected upwardly along the outside of the shaft between the shaft and the housing H to a discharge vent V.

A generally bell-shaped upper dome 16 is securely welded to the upper air intake portion 12 at 18 so as to provide an air-tight connection. The discharge vent V is generally cylindrical in its overall contour and is welded intermediate its ends at 20. The outer edge of this vent is provided with a bead 22 to facilitate the formation of a suitable connection between the air filter and any appropriate part leading to the engine. The inner edge 24 is belled or flared outwardly and resides within the upper dome 16, the purpose of this belled or flared edge to be explained hereinafter.

The central portion of the outer housing H is composed of a cylindrical member 26 joined at its upper end by a cylindrical connecting ring 28 to the dome 16, the joints being made by any suitable connecting means, such as welds 30 and 32. A cylindrical body member 34 depends from the lower edge of the cylindrical member 26 and is connected thereto by another cylindrical connecting ring 36 which is very similar in contour to the upper connecting ring 28. This cylindrical body member 34 has an outside diameter considerably less than the outside diameter of the cylindrical member 26, the reason to be explained hereinbelow. Again, any conventional means of connection may be used to secure the connecting ring 36 to member 26 and body member 34, such as welds 38 and 40.

A permanent mass 42 of filter material is interposed between the cylindrical member 26 and the vertical air shaft 10, this filter mass taking the form of loose wavy wire or suitable material. It has a relatively fine consistency in the form of a loosely packed wire wool and acts as a reservoir for the excess oil in the cup C which will be explained hereinafter. The upper edge of the filter mass is provided with a screen 44 which is retained in its proper position by a cylindrical bracket 46 welded to the vertical air shaft 10, the purpose of this screen being to retain the filter mass 42 within the confines of its allotted position in the cylindrical member 26. The lower surface of the filter mass is provided with a retaining member 48, commonly termed a spider, which has a screen 50 loosely mounted on its upper surface. The spider is provided on its inner and outer cylindrical edges with a down-turned flange 52 which is removably joined to the body member 34 by a dimple connection 54. The retaining member 48 is not included in the weld between body member 34 and connecting ring 36 at 40, so that it can be disassembled from the outer housing H by sliding the same downwardly along the vertical air shaft 10, as the inner flange 52 fits snugly against but is not connected to the air shaft.

A pair of filter cartridges K-1 and K-2 are removably stationed between body member 34 and the lower portion 14 of the air shaft 10. Each cartridge is composed generally of an outer and inner ring, 56 and 58 respectively, which are interconnected by a set of spokes 60 which form a continuation of the outer ring, the spokes proceeding downwardly and inwardly to an up-turned flange 62. This flange overlaps and mates with the lower edge of the inner ring which may have any configuration to accommodate the flange. A screen 50 similar to the one on the lower surface of the filter mass 42 is provided on both the upper and lower surfaces of each of the cartridges and is retained in place by appropriately directed flanges on the outer and inner rings. The inner ring of each cartridge has a circular depression 66 which receives projections 67 formed on leaf spring members 68, these springs being connected to the lower portion 14 of the air shaft. The springs are used to retain the cartridges in position after they have been inserted upwardly over the air shaft to a desired position below the filter mass 42 until the cup is mounted. In the instant embodiment I have shown three such springs engaging the circular depression in the lower cartridge; however, as many springs as desired may be used.

The upper cartridge K–1 in the present embodiment has a screening material 64 of horsehair or the like in a tightly matted or compressed condition in a dense mesh so as to present an effective screening medium to the air on its way to the engine. The lower cartridge K–2 is filled with a coarse wire screening material 65 and is in general less dense than the material 64 of the upper cartridge K–1. On a relative basis the screening material of the lower cartridge K–2 is the least fine of the screening materials used in the removable cartridges, as this cartridge performs the task of a precleaner. This is to say that only the larger particles being carried in the air will be caught and retained by this cartridge whereas the screening material of the upper cartridge K–1 is substantially finer to intercept smaller particles of foreign material than those collected by K–2. In this fashion progressively finer screening mediums are presented to the air flow so that particles of decreasing size are progressively filtered out during the air flow through the over-all screening material.

The lower cartridge K–2 is provided with a plurality of tabs 70 which form an anchor point for a bracket spring 72 to be described hereinbelow. These tabs, together with the spring 72, prevent insertion of the cartridges K–1 and K–2 in reverse order so that the screening mediums contained in each are always presented to the air in the order of their relative screening intensity.

In the event that the upper cartridge K–2 has become frozen in position due to the accumulation of excess grit and dirt, to facilitate the removal of the same after the lower cartridge has been withdrawn, I have provided a small chain 76 attached to and swung between two of the spokes 60 of the upper cartridge. By this structure after the lower cartridge K–2 has been removed the chain will dangle vertically downwardly in a loop so that it can be used as a handle to free the upper cartridge from any of the grit and dirt accumulated in and around its sides. When the lower cartridge has been inserted firmly against the underside of the upper cartridge, the chain will easily compress or collapse between the two so that it does not interfere in any way with the proper fit of one against the other. It should be understood that more than one of these small chains can be used, if desired.

The oil sump or cup C is removably attached to the body member 34 by three pivoted bolts 80 which are mounted on the lower portion of the body member by brackets 82. These bolts engage an equal number of slotted brackets 84 on the outer portion of the cup C so that a firm connection is afforded by taking up on wing nut 86. The lower portion of the body member 34 is provided with a sealing member 88 which cooperates with the upper edge of the cup C which has been turned over so as to form both an air and liquid tight seal after sufficient tightening has been accomplished by the bolts 80.

An inner frame structure, indicated generally at F, is positioned within the cup C to prevent spilling and slushing of the oil in and around the cup as the air cleaner is subjected to rough handling by the tractor during its heavy duty operation. This frame structure F additionally serves as a trap or stop for the grit and dirt that has settled out from the filters with the oil into the bottom of the cup C. It includes an upper ring member 90 which has a flange 92 extending sufficiently outwardly so as to rest on a cylindrical shoulder 94 formed in the surface of the cup C. The interior of the ring has been completely removed at 96 so that no obstructions are interposed to restrict the free circulation or flow of the oil and air to and from the filter medium. Welded to the lower edge of ring 90 by a series of tack welds is a baffle 98, this baffle being generally of a concentric or tapered configuration so that its surface proceeds inwardly and downwardly to a collection of discharge slots 100. The center portion of the baffle is provided with an orifice 102 which is covered by a dome member 104 that forms a guiding means for the air as it is brought down the vertical air shaft 10. The domed configuration of this member is such as to disperse the air radially outwardly to the entire lower surface of the filter cartridge K–2 so as to effect an even distribution of the oil and air. Connected to the lower surface of baffle 98 is a separator member 106 which extends outwardly to a depending flanged edge 108 adjacent the inner surface of the cup C. The dome member 104 and the separator member 106 are connected to the baffle member 98 by any appropriate means such as spot welds 110. The inner surface of the separator member proceeds inwardly from the flanged edge 108 and downwardly to a cylindrical trough 112 and then upwardly to a crown 114 with an orifice 116 in its center. It should be noted that the orifice 116 in the separator member and the orifice 102 in the baffle member approximately coincide and are both covered by the dome member 104. The dome member is provided with a perforation 118 at its apex so as to allow an upward flow of air therethrough to vent the air pocket formed thereunder during filling of the cup C.

The inner frame F is removably supported on the cylindrical shoulder 94 and is not connected in any direct fashion to the housing H. As the cup is removed by detaching bolts 80, the inner frame will also be removed. The bracket spring 72 engages the inner frame F along an outer circumferential portion of the ring member 90 so that as the cup is drawn tightly into engagement with the sealing member 88, the bracket spring bears against the inner frame which tends to compress its coiled ends 74 so that a taut, rigid connection is acquired. The bracket spring serves both to apply pressure upwardly on the cartridges K–1 and K–2 taking the load of their weight off of the leaf spring members 68 on the center tube and downwardly on the inner frame structure F through the ring member 90.

The use, operation and function of my device is as follows:

Due to the vacuum placed on the cleaner by the engine through vent V, air is drawn down the vertical air shaft 10 and upwardly along the outside of the air shaft through the screening medium. At the point at which the air reverses itself from its downward to its upward flow it encounters a pool of oil contained in the cup C, an oil level existing at approximately the level indicated in Fig. 2. Due to the rapid movement of the air through the cleaner the pressure is reduced and the oil is drawn up through the filter cartridges and the filter mass 42 so as to adequately saturate the same and effect an extremely desirable cleaning action. As the air moves from the top of the stationary screening material to and through the outlet vent V, it has a tendency to carry some of the oil with it; however, this tendency is reduced by the presence of the flared or belled edge 24 on the inside of the vent.

Figure 2:
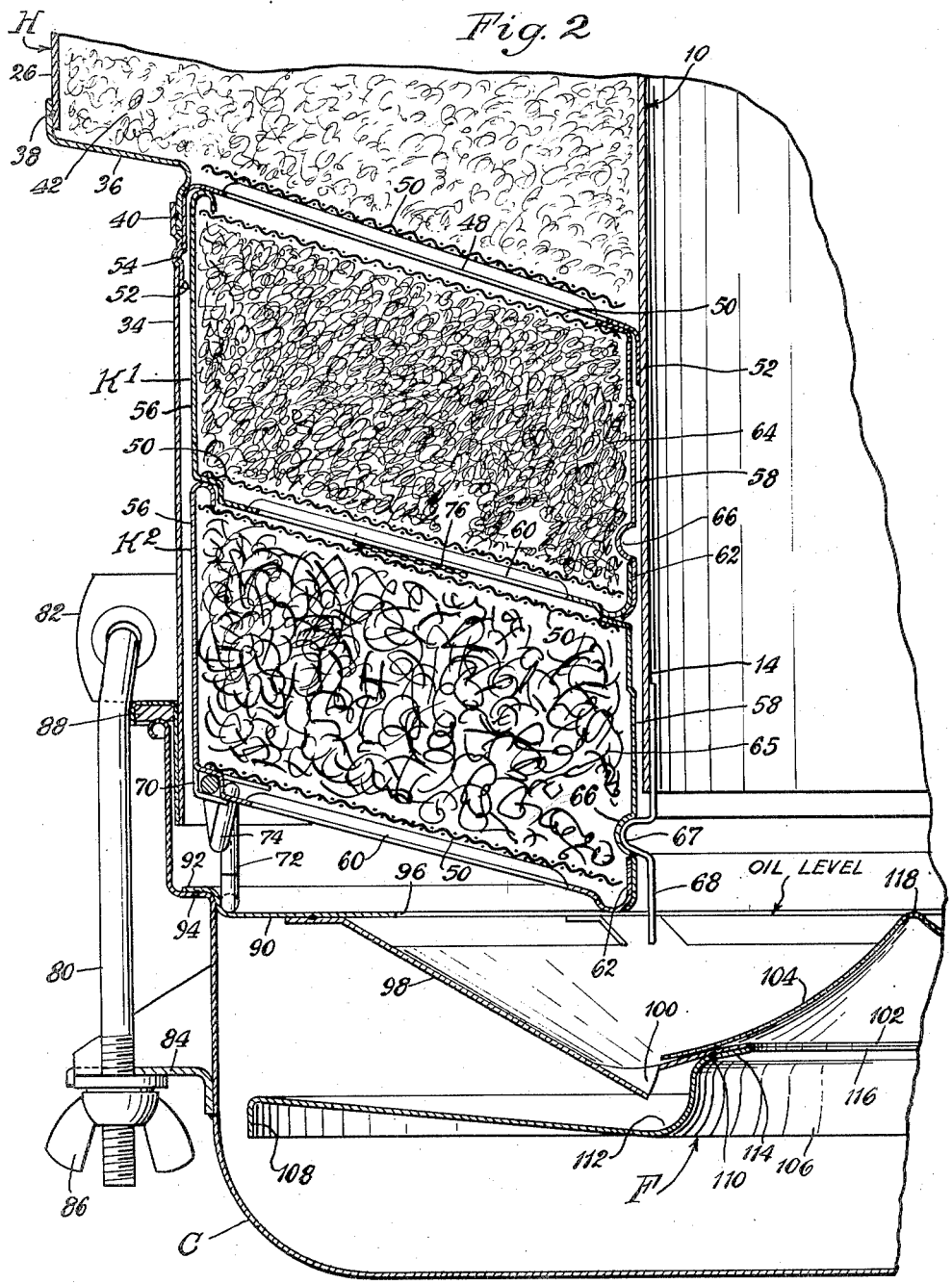
Figure 2 is a sectional view of a portion of Figure 1 showing the details of the oil bath and the insertable cartridges.

As shown in Fig. 2, all of the oil from the oil level down to an imaginary plane passing horizontally through the middle of the inner frame structure F at approximately weld 110 will be carried upward by the air. This is a great deal more oil than can be accommodated at times in the two cartridges K–1 and K–2 and some means must be provided in the form of a reservoir to receive this oil and prevent its flow into the intake manifold of the internal combustion engine. The filter mass 42 performs this function and I have enlarged the outside diameter of the cylindrical member 26 so that the total volume of this mass will be greatly increased. If the outside diameter of the cylindrical member 26 were the same as the diameter of the body member 34, the air cleaner would have to be extended quite a distance upward to provide sufficient volume for the excess oil. By increasing the outside diameter of the body member 34, I have considerably shortened the height of the overall cleaner while retaining the same reservoir volume.

It should be understood that the cartridges K–1 and K–2 perform nearly all of the cleaning functions and the reservoir area above with the filter mass 42 performs mainly the function of receiving and holding the excess oil.

It should also be understood that any number of insertable cartridges can be used depending upon how many are desired, and I do not wish it to be understood that the two shown and described constitute a static number. If more than two are found desirable and were used, the cleaner housing would have to be extended to accommodate them or the size of each of the cartridges might be reduced. It will also be understood that under such conditions the filtering intensity of the screening medium of the cartridges is graduated appropriately so that a progressively increasing screening action is obtained during the air's movement toward the engine.

To replace or clean the insertable cartridges the bolts 80 are first disconnected and swung away from the brackets 84 after which the oil cup C is carefully removed. The operator then moves the spring clamps 68 toward one another so as to free the lower cartridge which is easily withdrawn by the operator's other hand using the bracket spring 72 as a handle. In the majority of cases the upper insertable cartridge will also come out with the lower cartridge; however, if it is frozen or stuck in position, it can easily be shaken loose by the use of the chain handle 76. In the replacement of a pair of fresh clean cartridges, if the operator inadvertently inserts a lower cartridge K–2 first it will be impossible to properly seat the upper cartridge therebelow due to the presence of the tabs 70 and the spring 72.

The material of the filtering mass 42 should have a high oil retentivity but at the same time should be a relatively low cost item. It should also be understood that the cleaning effectiveness of this part of the filter may be less than any of the mediums in the lower region of the filter space.

While I have shown and described a preferred form of my invention, it should be understood that it is only illustrative and should not be interpreted to restrict my invention except by the appended claims. For example, in the specification I have referred to oil as the liquid. However, any other suitable liquid or fluid could be used.

I claim:

1. In a liquid bath air cleaner, a central intake air shaft, a housing surrounding the air shaft, the space between the housing and the shaft constituting a filter space chamber, the end of the housing opposite the intake end of the air shaft being provided with a removable cup, at least two insertable cartridges positioned within the space, removably surrounding the air shaft, the cartridges having filtering intensities that increase from one cartridge to the next along the path of air movement through the filter space chamber, the cartridge relatively adjacent the removable cup being provided with a projection element so that the cartridges can only be inserted in the order of decreasing filtering intensity, the cartridges remote from the removable cup being provided with a depending collapsible member attached to the cartridge so that, after the lower cartridge has been removed, the collapsible member depends and constitutes a handle by which the cartridge may be manipulated.

2. In a liquid bath air cleaner, an air shaft, a housing surrounding the air shaft, the shaft and housing defining between them a filter space, one end of the housing being closed by a sump cup adapted to contain a quantity of liquid and to redirect the air moving through the air shaft to the filter space, manually actuatable attaching means for detachably connecting the sump cup to the end of the housing, the housing being composed primarily of two main portions, one portion being adjacent the sump cup and smaller in cross-section than the other and serving primarily as a filter area, the other portion being relatively removed from the sump cup and serving primarily as an excess liquid reservoir, filter elements positioned in the said one portion of the housing, means between and associated with the filter elements and the sump cup for forcing the filter elements fully into the said one portion of the housing when the sump cup is fully seated on the end of the housing, and manually operable clamping means for removably retaining the filter elements in the said one portion of the housing when the sump cup has been removed.

3. In a liquid bath air filter, a filter casing defining a path of air movement from an inlet to an outlet, a removable cup closing one end of the housing and adapted to contain a quantity of liquid, a filter space in the housing and an air passage concentric with it, a plurality of insertable and removable filter elements in the filter space, and a depending chain-type member attached to at least one of the elements to function as a handle in the event the element becomes stuck.

4. In a liquid bath air cleaner, an air shaft, a housing surrounding the air shaft, the shaft in the housing defining a filter space between them, one end of the housing being enclosed by a sump cup adapted to contain a quantity of liquid, manually operable attaching means for connecting the sump cup to the housing, the housing being composed primarily of two main portions, one being adjacent the sump cup and smaller in cross section than the other and serving primarily as a filter area, the other being relatively removed from the sump cup and serving primarily as an excess liquid reservoir, and one or more filter elements positioned in the said one portion of the housing.

5. The structure of claim 4 characterized by and including a filter medium in the said other main portion of the housing which is relatively fine and has the filtering consistency of loosely packed wire wool or the like, and at least two filter elements removably positioned in the said one main portion of the housing, one above the other, in the nature of removable cartridges, the upper removable element having a filter medium which has a substantially finer filtering consistency than that of the filter medium of the lower removable element.

6. In a liquid bath air cleaner, a housing having an open end and having an inlet and outlet defining an air path, a sump cup removably attached to the open end of the housing to contain a quantity of liquid, an air passage and filter space concentrically arranged in the housing and separated by a center tube, at least one cantilever type spring element on the center tube, at least one filter element removably inserted through the open end of the housing and positioned in the filter space, and coacting means between each spring element and the filter element for removably retaining the filter element in the housing when the cup is removed, the center tube being the air passage and the filter space surrounding it, each spring element extending beyond the end of the center tube and having a radially outward projection disposed beyond the end of the tube, each filter element having at least one indentation to accept the outward projection on each spring element, and the projection extending radially outward beyond the side of the tube, the end of each spring element extending a substantial distance below the projection to function as a manually manipulatable tab.

7. In a liquid bath air cleaner, a housing with an open end and having an inlet and outlet defining an air path, a sump cup removably attached to the open end to contain a quantity of liquid, an air passage and filter space concentrically arranged in the housing and separated by a center tube, at least one cantilever type spring element on the center tube, at least one filter element removably inserted through the open end of the housing and positioned in the filter space, and coacting means between each spring and the filter elements for removably retaining the filter elements in the housing when the cup is removed, the cantilever spring elements being on the lower end of the center tube and extending below it, the resiliency of the spring element or elements being such that they will removably support the filter elements and will flex to allow the filter elements to be manually inserted and removed, and coacting means between the sump cup and the filter elements constructed to force the filter elements into the housing slightly when the cup is fully seated thereon so that the weight of the filter elements will be taken off of the spring elements during normal operation of the cleaner.

References Cited in the file of this patent

UNITED STATES PATENTS

| | | |
|---|---|---|
| 1,062,942 | Woods | May 27, 1913 |
| 1,395,833 | Kleng et al. | Nov. 1, 1921 |
| 1,532,730 | Chalupa et al. | Apr. 7, 1925 |
| 2,040,376 | Hallerberg | May 12, 1936 |
| 2,335,428 | Lofgren | Nov. 30, 1943 |
| 2,457,321 | Russell | Dec. 28, 1948 |
| 2,570,623 | Wistor | Oct. 9, 1951 |
| 2,627,935 | Beach | Feb. 10, 1953 |
| 2,632,477 | Weibel | Mar. 24, 1953 |

FOREIGN PATENTS

| | | |
|---|---|---|
| 395,814 | Great Britain | Mar. 15, 1932 |